US005647112A

United States Patent [19]

Arvizu

[11] Patent Number: 5,647,112

[45] Date of Patent: Jul. 15, 1997

[54] UNIVERSAL PRESS PIN REMOVER

[76] Inventor: Jesus Arvizu, 8600 Robby SW., Albuquerque, N. Mex. 87121

[21] Appl. No.: 511,134

[22] Filed: Aug. 4, 1995

[51] Int. Cl.[6] ........................ B23P 19/04

[52] U.S. Cl. ........................ 29/268; 81/426.5

[58] Field of Search ........................ 81/394, 419, 424, 81/426, 418, 421, 422, 423, 424.5, 426.5; 29/253, 270, 267, 268

[56] References Cited

U.S. PATENT DOCUMENTS

| | | |
|---|---|---|
| 133,821 | 12/1872 | Barton . |
| 2,755,541 | 7/1956 | Kruger . |
| 3,024,681 | 3/1962 | Sadler . |
| 3,314,320 | 4/1967 | Early . |
| 4,365,411 | 12/1982 | Muldoon . |
| 5,058,414 | 10/1991 | Hayes . |
| 5,283,936 | 2/1994 | Pickles et al. . |

*Primary Examiner*—Robert C. Watson
*Assistant Examiner*—Thomas W. Lynch
*Attorney, Agent, or Firm*—Kevin Lynn Wildenstein

[57] ABSTRACT

The present invention provides a tool for the partial or complete removal and installation of press pins lodged within a latch device which fasten an automobile window to an automobile body, or press pins lodged in latches which are attached to an automobile window. The present invention employs novel jaws to partially or completely remove press pins of any size by the use of unique, removable tips. These tips slidably engage one jaw of the press pin remover tool, and after the tip is securely engaged within the jaw, it is capable of rotation about an axis perpendicular to the length of the tool. Rotation around such an axis allows the tip, and more generally the tool, to adapt to any size latch as used in the automotive industry for the purpose of partially or completely removing a lodged press pin. The present invention is also adapted to install press pins into latch portions in order to construct a completed latch device. In this application, the present invention can employ either special tips or its handle portions to apply an axial thrust force against a press pin in order to force the press pin partially or completely into a latch portion channel or hole.

16 Claims, 3 Drawing Sheets

UNIVERSAL PRESS PIN REMOVER

FIELD OF THE INVENTION

The present invention, in general, relates to a universal press pin removal tool, and more specifically to a tool for removing press pins lodged within an automobile window latch which fastens an automobile window to an automobile body. The present invention is also capable of inserting a press pin into a latch portion when attaching a latch device to an automobile window or attaching the latch device to an automobile body.

BACKGROUND OF THE INVENTION

Devices known as latches are employed to engage or fasten mechanical or structural parts together. Latches are usually composed of two or more separate latch portions which, when interconnected by a press pin, are rotatable relative to each other. Press pins are typically inserted into a channel or hole on one end of the latch portions to connect and hold the separate latch portions together. The press pins are usually constructed of rolled-up sheet metal, and can also be constructed of material which allows a press pin to be formed and which allows the press pin to exert a resilient circumferential force when inserted into a latch portion channel or hole. When inserted into such a latch portion hole or channel, the press pin's circumferential resiliency expands to hold the latch portions in secure engagement while still allowing the latch portions to rotate relative to each other. Depending on the application, several latch portions and several press pins can be used to construct a single latch device.

In the automotive industry, latches are typically used to fasten an automobile window to the automobile body. In this regard, the latch device interconnects the automobile window with the automobile body. This design allows the window to open an amount equal to the length of the expanded latch. In another application, a latch device is utilized on windows to secure the window in a locked position against a window pane on an automobile door, thereby preventing opening of the window. A classic example of this application is a ear window vent (generally employed in older model automobiles), which employs a latch on the window to secure the window in a closed, locked position. When this type of latch is rotated to an open position, the vent window will also then be capable of opening.

Several problems exist when windows, which are coupled to latch devices, are broken, in need of repair, or require removal or replacement for some other reason (e.g., to apply tint material to the window). In the auto glass industry, in order to remove an automobile window for replacement or repair, latch devices attached to the broken window (or, the window which must be tinted) must be carefully removed. If the window is broken, this presents a safety hazard to the glass installer, as the installer must first remove the press pins holding the latch together in order to remove the latch from the broken window (and, in some cases, from the automobile body). Typically, personnel involved in this task employ a hammer and a small, but sharp, punch tool to remove the lodged press pin from its sitting. Depending on the strength of the press pin and the location of the latch relative to the window, the removal of the press pin can be time consuming. Moreover, if the installer is using dangerous tools to remove the press pins, such as a hammer and a sharp punch, the installer may cut himself on the broken glass. Even if the glass is not broken and is merely being replaced or being tinted, use of a hammer and punch to remove press pins in the close proximity to the glass may lead to breaking the glass, scratching the tint or harming the automobile body.

The use of a hammer and sharp punch tool may also lead to additional problems. First, the use of such tools may be unsafe to the installer depending on the orientation of the latch relative to the window and automobile body. Second, improper use of the tools may further break or shatter the auto glass or damage the automobile body interior or exterior. Third, an installer must usually have punches of different diameters readily available in order to remove press pins from different sized latch channels. Therefore, a need exists for a press pin remover tool that is safe to both the installer, the automobile glass and the automobile body.

When repairing or replacing an automotive window which is attached to a latch device, it is also economically justified to utilize the same latch portions and the same press pins when installing the repaired or replaced window. In this regard, the automobile owner saves money by not purchasing brand new latch devices or brand new press pins. In this case, the installer usually employs the punch and hammer to install the same press pins into the same latch. This circumstance requires the installer to hold the hammer with one hand and with the other hand, contact one end of the sharp punch against one end of the press pin. With the hammer, the installer then gently taps the press pin back into the latch portion's hole or channel. Of course, this method can also be used with brand new press pins or brand new latch portions. Using the hammer and punch tools in this situation to install the press pins back into the latch channel, however, results in many of the same problems an installer finds when removing the press pins. Thus, a need exists for a tool which can readily and easily install press pins into a latch channel or hole in order to construct a latch device.

Prior to the present invention, several patents disclose a hand tool which incorporates spaced apart jaws which function to punch an object (such as U.S. Pat. No. 5,058,414 to Hayes or U.S. Pat. No. 3,024,681 to Sadler) or serve to expel an object from a hinge or similar object (such as U.S. Pat. No. 133,821 to Barton or U.S. Pat. No. 3,314,320 to Early). These disclosures, however, are inadequate for several reasons. First, they are not adapted to remove any type of latch press pin. Second, these disclosures are not adapted to install press pins into latch portions in order to construct the latch device. Third, such disclosures are not adapted to operate on various sized latch devices as is found in most automobiles today.

U.S. Pat. No. 5,283,936 to Pickles discloses an adjustable apparatus for removing press pins secured in a roller member of a cam dog of a railway brake or truck brake apparatus. Pickles disclosure has two spaced apart jaws. Upon one of these jaws is formed an integral short, cone-shaped peg, and upon the other jaw, a groove or opening may be formed. In operation, Pickles' peg contacts one end of a press pin in a bore to force the pin from the bore. Pickles disclosure, however, is deficient for several reasons. First, Pickles use of an integral short peg prevents a fairly complete removal of a long, extended press pin. Second, because the peg is cone-shaped, the apparatus is prevented from continually applying axial thrust force within the bore to remove the press pin. Third, Pickles' peg is stationary upon one jaw and therefore incapable of applying an axial thrust force to those press pins which have a unique orientation relative to the latch device such as found in many automotive latch designs. Finally, because Pickles' apparatus only partially dislodges the press pin, the operator of this apparatus must physically grasp the press pin by hand or other device in order to completely remove the press pin. Therefore, a need exists for a press pin remover tool which is capable of dislodging and removing, in a fairly complete manner, a variety of press pin shapes and sizes. This tool must also be capable of removing press pins which are uniquely situated relative to the latch position.

Accordingly, it is an object of the present invention to provide a press pin removal tool which easily removes press pins from latch channels or holes, wherein such latches are employed as a fastener between an automobile window and the automobile body, or, are employed as a window lock for an automobile window.

It is a further object of the present invention to provide a press pin removal tool which, on one jaw, incorporates interchangeable press pin remover tips of various sizes in order to remove various sized press pins lodged within a latch.

It is a further object of the present invention to provide a press pin removal tool which, on one jaw, allows the rotation of remover tips in order to partially or completely remove press pins lodged in any orientation within a latch.

It is also an object of the present invention to provide a press pin removal tool which incorporates a simple method of retaining tips by direct coupling of the tips with the handles of the press pin removal tool.

It is also an object of the present invention to provide a press pin removal tool which is capable of partially or completely installing or inserting press pins into a latch portion's channel or hole.

It is also an object of the present invention to provide a press pin removal tool which is economical and simple to produce.

SUMMARY OF THE INVENTION

The present invention provides a tool for the partial or complete removal and installation of press pins lodged within a latch. More specifically, the present invention is a tool which removes press pins from latches which fasten an automobile window to an automobile body, and also to latches which are only attached to the automobile window. The present invention employs novel jaws to partially or completely remove press pins of any size by the use of unique, removable tips. These tips slidably engage one jaw of the press pin remover tool, and after the tip is securely engaged within the jaw, it is capable of rotation about an axis perpendicular to the length of the tool. Rotation around such an axis allows the tip, and more generally the tool, to adapt to any size latch as used in the automotive industry for the purpose of removing or installing a lodged press pin.

Additionally, the present invention is adapted to install press pins into latch portions in order to construct a completed latch device. In this application, the present invention can employ a tip which is substantially flat to apply an axial thrust force against a press pin in order to force the press pin partially or completely into a latch portion channel or hole. As an alternate embodiment, the present invention can employ its handle portion with its securely attached tips to apply an axial thrust force against a press pin in order to force the press pin into a latch portion channel or hole.

Finally, in another embodiment, the present invention includes a receptacle attached to the jaw opposite the elongated tip, wherein upon the removal or dislodgement of a press pin, the press pin will fall through the jaw opposite the elongated tip and is retained in the receptacle. In a preferred embodiment, the receptacle is cone shaped.

DESCRIPTION OF THE PREFERRED EMBODIMENT

Figure 1:
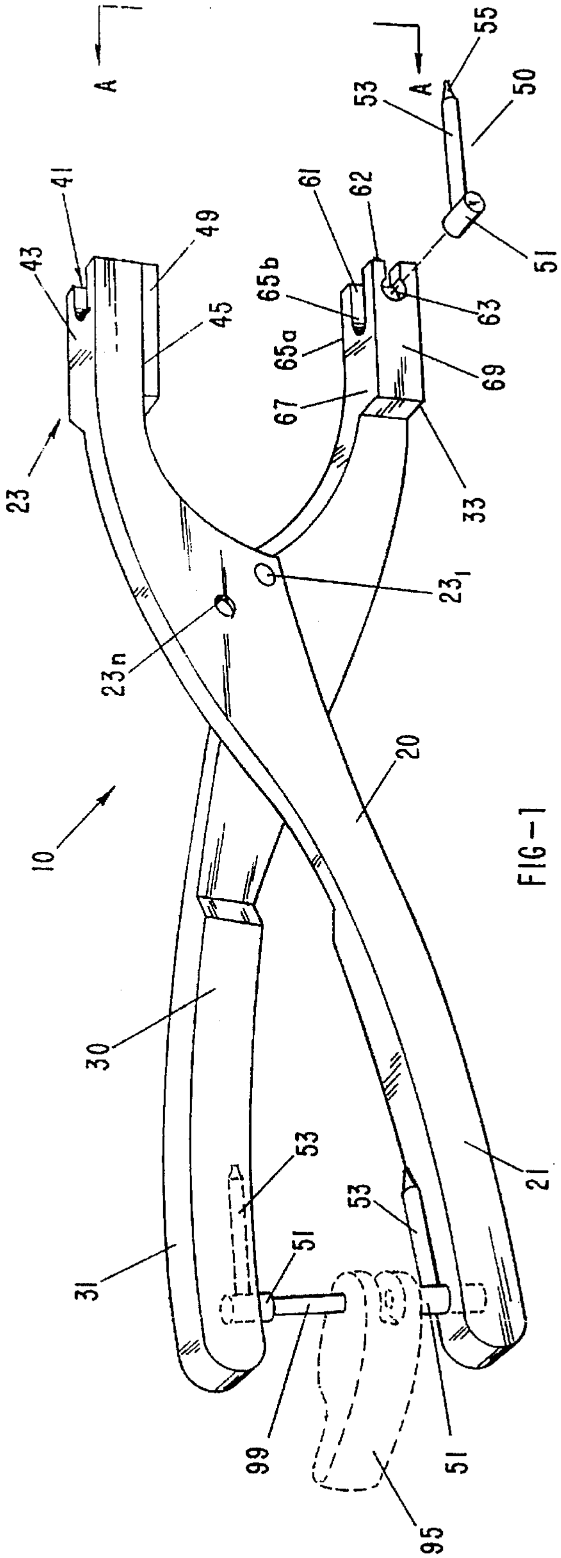
FIG. 1 is a side perspective view of the preferred embodiment of the present invention.
Figure 2:
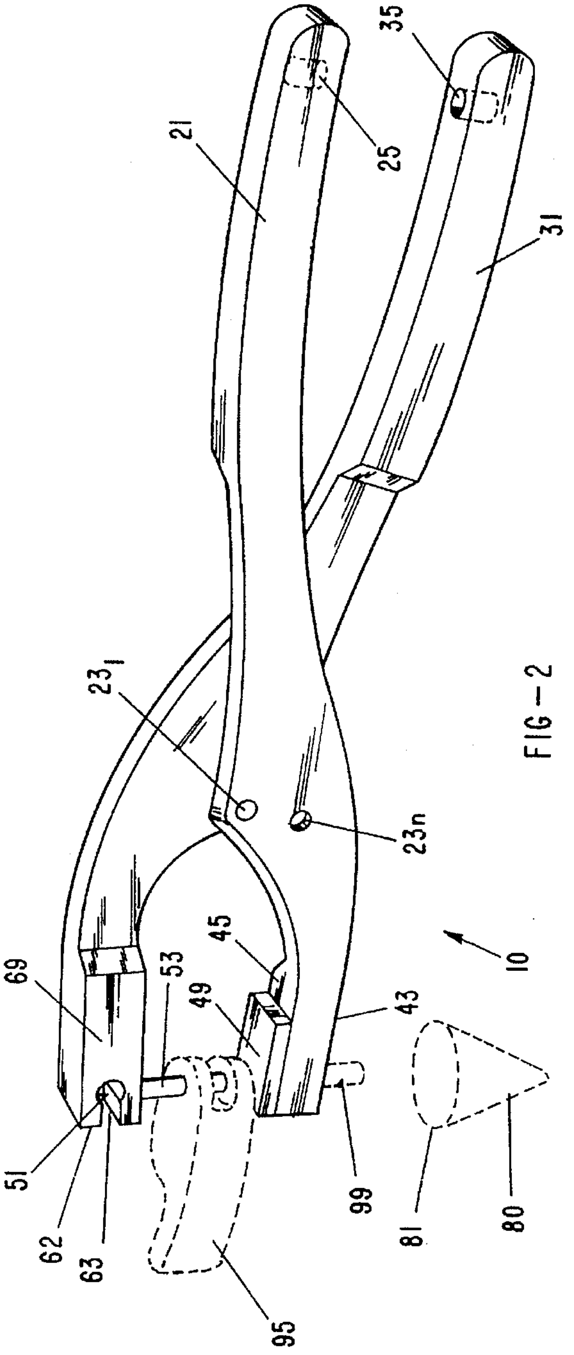
FIG. 2 is a rotated side perspective view of the present invention as seen from the same side as shown in FIG. 1, including an optional press pin receptacle.

The universal press pin removal tool is shown generally in FIGS. 1 and 2. The tool consists of a first member 20 and a second member 30. First member 20 has a handle portion 21 and a head portion 23. Head portion 23 includes a flat inner face 45 and a flat outer face 43, wherein a U-shaped hole 41 is formed therethrough which is adapted to receive a dislodged press pin, such as that depicted in FIG. 2 as item 99, as it is removed from a latch portion 95. In one embodiment, friction pad 49 is attached to first member's flat inner face 45 by any traditional method. Friction pad 49 has formed the same U-shaped hole 41 as head portion 23. Friction pad 49 is optional, but as is seen in FIG. 2, it allows the operator to gain additional grip or friction from the underside of a latch portion 95 when press pin 99 is removed from latch portion 95 by use of the press pin removal tool 10.

As seen in FIGS. 1 and 2, removable tip 50 has three essential, but integral, components. Removable tip 50 includes elongated axial thrust portion 53 formed between cylindrical tip head 51 and contact end 55 formed at an end opposite cylindrical tip head 51. Elongated axial thrust portion 53 is formed of different diameters. Contact end 55, as those skilled in the art can appreciate, is formed either pointed or blunt, depending on the operator's requirements. For example, if contact end 55 is sharp or pointed, it can contact one end of press pin 99 to assist in removing the press pin 99 from latch portion 95. If contact end 55 is blunt, it can contact one end of press pin 99 to assist in installing or pushing press pin 99 into latch portion 95. Removable tip 50 is interchangeable and removable with other similarly designed tips, wherein each tip is formed for the partial or complete removal or installation of various sized press pins or various sized latch portion holes or channels.

Figure 5:
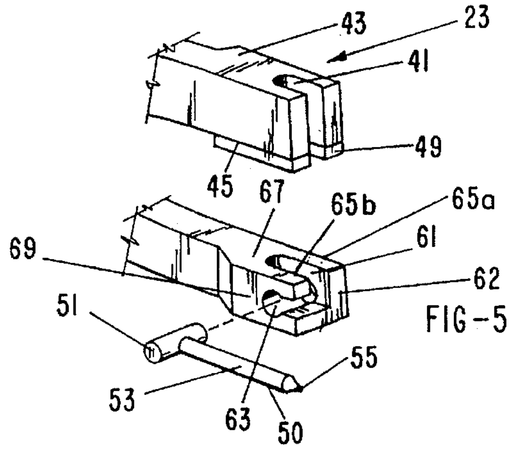
FIG. 5 is a partial side perspective view of the present invention as seen along A-A in FIG. 1.
Figure 6:
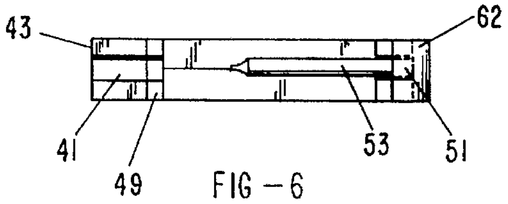
FIG. 6 is a front view of the present invention.

As seen in FIGS. 1 and 2, second member 30 has a handle portion 31 and a head portion 33. As seen in FIG. 5, head portion 33 further includes end face 62 and flat inner face 67. Flat inner face 67 has a U-shaped hole 61 formed part-way therein, and a second side face *65a* which has an internal wall surface *65b* opposite second side face *65a*. Head portion 33 further includes a first side face 69 having a hole 63 bored therethrough. Hole 63 is shaped so as to receive cylindrical tip head 51 and a segment of axial thrust portion 53 adjacent to cylindrical tip head 51 of removable tip 50. Hole 63 is formed to receive removable tip 50 when axial thrust portion 53 is linearly parallel to the length of second member 30. When tip 50 is inserted into hole 63 past axial thrust portion 53, one end of cylindrical tip head 51 contacts inner wall surface *65b* thereby preventing further advancement of tip 50. In this engagement, tip 50 is free to rotate about an axis perpendicular to the length of second member head portion 33 between end face 62 and a top portion of U-shaped hole 61.

Figure 3:
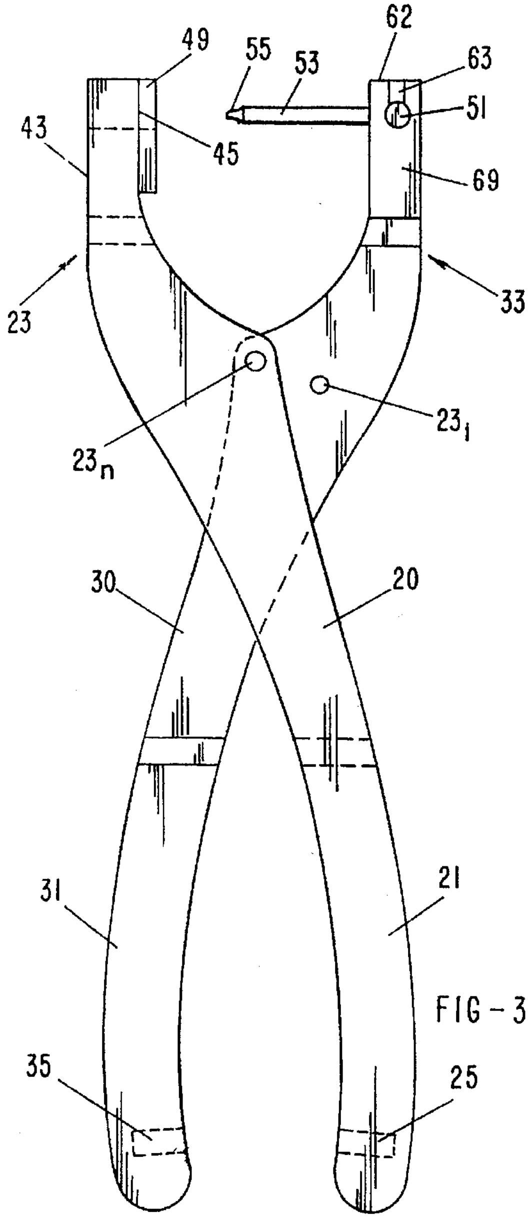
FIG. 3 is a side view of the present invention as shown in FIG. 1.
Figure 4:
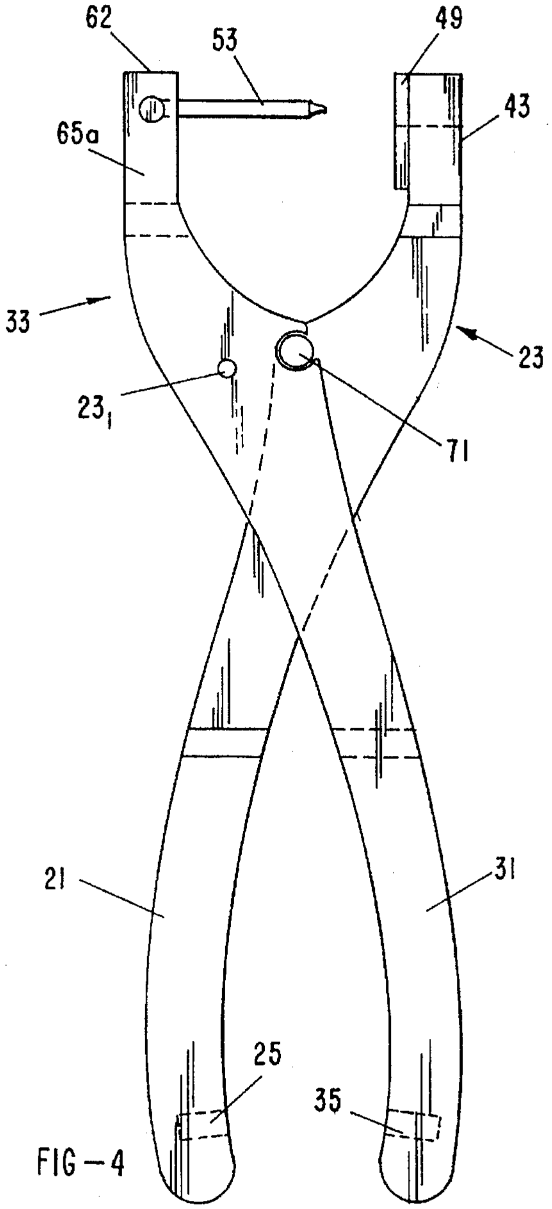
FIG. 4 is an opposite side view of the present invention as shown in FIG. 3.
Figure 7:
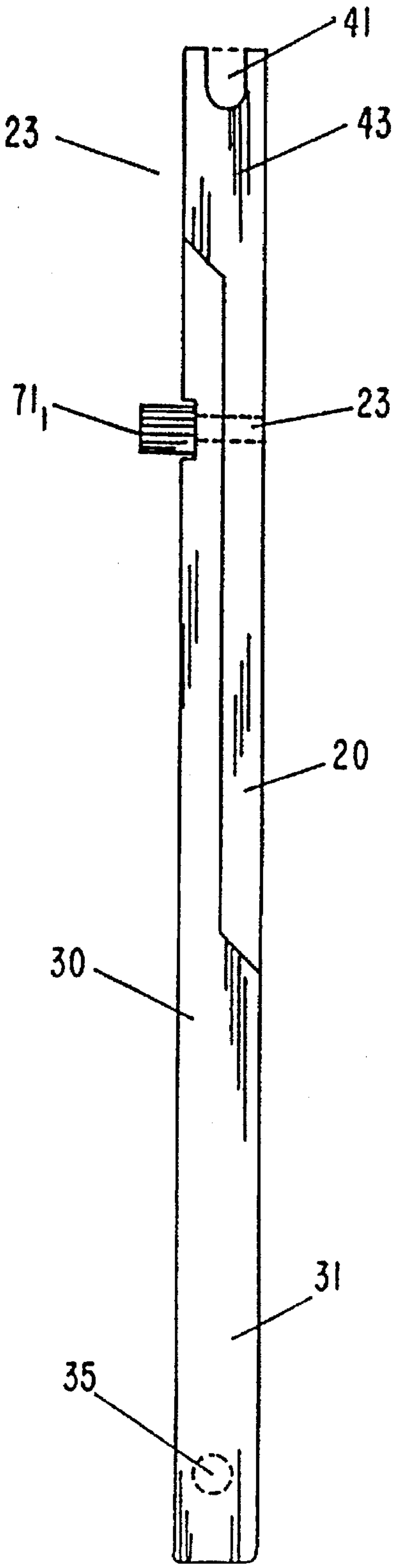
FIG. 7 is a bottom view of the present invention.
Figure 8:
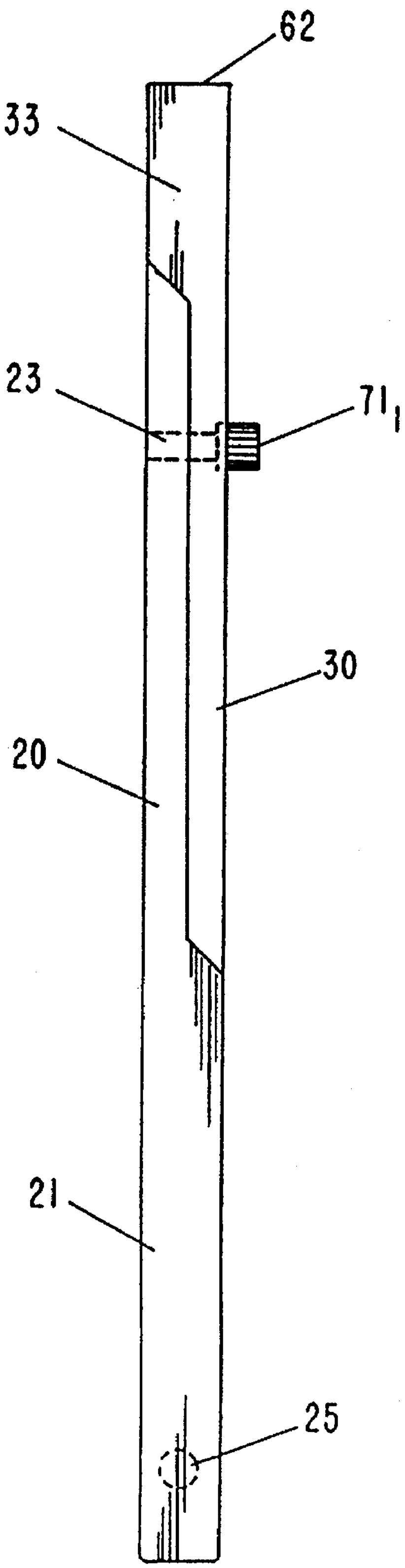
FIG. 8 is a top view of the present invention.

As seen in FIGS. 3 and 4, first member 20 is connected to second member 30 by any suitable or conventional means known to one of ordinary skill in the art, such as a groove joint. In the preferred embodiment as shown in the Figures, both first member 20 and second member 30 have a plurality of internally threaded connection holes $\mathbf{23_1} \ldots \mathbf{23_n}$ formed between their respective handle portions 21,31, and their respective head portions 23 and 33. In one embodiment as seen in FIGS. 4 and 7–8, first member 20 and second member 30 are connected by engaging an externally threaded screw 71 having a friction head $\mathbf{71_1}$ into any one of the plurality of internally threaded connection holes $\mathbf{23_1} \ldots \mathbf{23_n}$. Friction head $\mathbf{71_1}$ allows an operator to easily screw or unscrew threaded screw 71 into any one of the plurality of internally threaded connection holes $\mathbf{23_1} \ldots \mathbf{23_n}$. Moreover, internally threaded connection holes $\mathbf{23_1} \ldots \mathbf{23_n}$ are positioned upon both first member 20 and second member 30 to allow rotatable tip 50 to access press pins within a wide variety of latch designs. Clearly, those skilled in the art will realize that numerous designs which allow first member 20 to connect to second member 30 exist which are within the spirit and the scope of the present invention.

In operation, tip 50 is inserted into bored hole 63 until tip 50 is prevented from further advancement by inner wall surface **65*b*. Tip 50 can now rotate about an axis perpendicular to the length of the press pin removal tool 10. As seen in FIG. 2, elongated axial thrust portion 53 is rotated to be in axial alignment with a latch portion hole or channel. When axial alignment occurs, first member's handle portion 21 and second member's handle portion 31 are brought close together (such as by squeezing both handle portions together), thereby bringing second member's flat inner face 67 to be in facing or confronting relationship with first member head portion's flat face 45. Axial thrust portion 53 is then positioned to provide a linear, axial force against one end of press pin 99 to push it through and out a latch portion's hole or channel while press pin 99 passes through first member's U-shaped hole 41**.

In another embodiment, handle portions 21 and 31 have cavities 25 and 35 formed within an interior face therein. Cavities 25 and 35 are shaped to securely receive cylindrical tip head 51. Cavities 25 and 35 have two purposes. First, cavities 25 and 35 serve to retain tips 50 in a secure fashion, thereby preventing loss of such tips when tool 10 is transported or in operation. Second, cavities 25 and 35 also assist in the installation of press pins into a latch portion. As seen clearly in FIG. 1, one end of cylindrical tip head 51 securely attached to one handle portion 31 is used to apply an axial force against one end of press pin 99. The other cylindrical tip head 51 located on the other handle portion 21 will counteract the force applied by the cylindrical tip head 51, thereby allowing press pin 99 to be installed or inserted into latch portion 95.

In another alternate embodiment, press pin removal tool also includes an optional press pin receptacle 80. Receptacle 80 is adapted to securely attach to a surface of first member's flat outer face 43 at a receptacle receiving end 81. While optional, receptacle 80 serves to receive press pin 99 as it is removed from a latch device. Thus, receptacle 80 serves to retain dislodged press pins to prevent the accidental loss of such press pins during the removal process.

Whereas the drawings and accompanying description have shown and described the preferred embodiment of the present invention, it should be apparent to those skilled in the art that various changes may be made in the form of the invention without affecting the scope thereof.

I claim:

1. An apparatus for universally dislodging press pins fitted into a latch, the apparatus comprising:

(a) a rotatable tip having an extended axial thrust portion integrally formed with a cylindrical tip head;

(b) a first member including a handle portion at one end, and at an other end, a head portion, the first member head portion having a flat inner face and a flat outer face, the first member head portion further including an aperture bored into and completely through the flat inner face and flat outer face for receiving the press pins;

(c) a second member having a handle portion at one end, and at an opposite end, a head portion, the second member head portion further having:

(i) a flat face having a U-shaped hole formed therein;

(ii) a first side face having a hole bore shaped to linearly receive the cylindrical tip head and a segment of the adjacent axial thrust portion therein when the tip's axial thrust portion is linearly parallel to the length of the second member;

(iii) a second side face having an internal surface opposite the second side face, the internal surface preventing further advancement of the rotatable tip when the rotatable tip is inserted in the first side face; and (iv) an end face, wherein the rotatable tip is capable of rotation about an axis perpendicular to the length of the second member head portion between the end face and a top portion of the U-shaped hole, the rotatable tip further adapted to engage and provide axial thrust on a press pin lodged into a latch; and (d) means for connecting the first member to the second member in secure rotatable relationship to allow the second member flat inner face to be in facing relationship with the first member head portion's flat inner face.

2. The apparatus according to claim 1, wherein the rotatable tip's cylindrical tip head is removably insertable through the second member head portion's first side face hole bore.

3. The apparatus according to claim 1, wherein the first member further includes a connecting portion integrally formed between the handle portion and the connecting portion, and the second member further includes a connecting portion integrally formed between the handle portion and the head portion, the means for connecting being disposed on both the first member connecting portion and the second member connecting portion.

4. The apparatus of claim 3, wherein the means for connecting includes a plurality of threaded grooves formed upon both first and second member's connecting portions thereby defining groove joints, the means for connecting further including a coupling means to connect the first and second members in groove relation.

5. The apparatus according to claim 3, wherein the means for connecting includes a plurality of internally threaded openings formed within both first and second member's connecting portions, the means for connecting further including an externally threaded screw sized to threadedly engage the internally threaded openings such that both first member and second member are coupled together in secure rotatable relationship to allow the second member flat inner face to be in facing relationship with the first member head portion first flat face.

6. The apparatus according to claim 5, wherein the axial thrust portion is elongated and further has a apex formed thereon at an end opposite the tip head, the tip head being formed perpendicular to the axial thrust portion at an end opposite the apex, and the tip head further being cylindrically wider than the axial thrust portion.

7. The apparatus according to claim 6, wherein a cylindrical axis of the tip head is substantially perpendicular to the first flat face.

8. The apparatus according to claim 5, wherein after formation of the first member handle portion with the second member handle portion both handle portions are brought together by squeezing force to bring second member's inner face in confronting relationship with the first member's head portion to provide an axial thrust against one end of a press pin, thereby allowing for removal of lodged press pins in different sized latches.

9. The apparatus according to claim 5 wherein the first head portion further includes a friction pad securely attached to the first member flat inner face, the friction pad having a cutout pattern conforming to the first head portion's U-shaped aperture and adapted to provide friction against and mold itself under a window latch when the apparatus is operated.

10. The apparatus according to claim 5, wherein both the first and second member's handle portion have an aperture disposed on an innermost position of each handle portion, each aperture being adjacent to one end of each handle portion, the handle portion being wider than the middle portion and of substantially the same width as the head portion, such that both apertures are in facing relationship when the means for connecting is connected.

11. The apparatus according to claim 5, wherein the first head portion further includes means for receiving a dislodged press pin, wherein upon operation of the apparatus, dislodged press pins will pass through the U-shaped aperture in the first member head portion, and be retained by the means for receiving dislodged press pins.

12. The apparatus according to claim 11, wherein the means for receiving dislodged press pins is a cone having an open end and an apex end, the open end being removably coupled to the first member flat outer face, the cone being of sufficient length to accept and receive dislodged press pins.

13. The apparatus according to claim 5, wherein said handle portion of said first member and said handle portion of said second member further include cavities formed upon a surface of each handle portion, each cavity being defined as substantially the diameter of said cylindrical tip head, said cavities being capable of securely receiving said cylindrical tip heads and said cavities being in confronting relation with each other whereby said cylindrical tip heads can be inserted into said cavities for secure retention, or alternately, for the application of an axial thrust to a press pin in order to install or insert a press pin into a latch channel or hole.

14. The apparatus according to claim 5, further including a press pin receptacle, said press pin receptacle being cone-shaped and having a receiving end, said receiving end adapted to securely attach to said first member's flat outer face, whereby upon the removal of a press pin, said press pin is retained in said press pin receptacle.

15. An apparatus for universally dislodging press pins fitted into a latch, the apparatus comprising:

(a) a rotatable tip having a single extended axial thrust portion integrally formed with a cylindrical tip head, the tip adapted to engage and provide axial thrust on a press pin lodged in a latch;

(b) a first member including a handle portion at one end, and at an other end, a head portion, the first member head portion having a flat inner face and a flat outer face, the first member head portion further including an aperture bored into and completely through the flat inner face and flat outer face for receiving the press pins;

(c) a second member having a handle portion at one end, and at an opposite end, a head portion, the second member head portion further having:

(i) a first side face; and (ii) a second side face, a segment of the axial thrust portion positioned between the first side face and the second side face, the rotatable tip being capable of rotation about an axis perpendicular to the length of the first and second side faces; and (d) means for connecting the first member to the second member in secure rotatable relationship to allow the second member flat inner face to be in facing relationship with the first member head portion's flat inner face.

16. An apparatus for universally dislodging press pins fitted into a latch, the apparatus comprising:

(a) a removable tip having an extended axial thrust portion integrally formed with a cylindrical tip head;

(b) a first member including a handle portion at one end, and at an other end, a head portion, the first member head portion having a flat inner face and a flat outer face, the first member head portion further including a U-shaped aperture bored into and completely through the flat inner face and flat outer face for receiving the press pins;

(c) a second member having a handle portion at one end, and at an opposite end, a head portion, the second member head portion further having:

(i) a flat face having a U-shaped hole formed therein;

(ii) a first side face having a hole bore shaped to linearly receive the cylindrical tip head and a segment of the adjacent axial thrust portion therein when the tip's axial thrust portion is linearly parallel to the length of the second member;

(iii) a second side face having an internal surface opposite the second side face, the internal surface preventing further advancement of the removable tip when the removable tip is inserted in the first side face; and (iv) an end face, wherein the removable tip is capable of rotation about an axis perpendicular to the length of the second member head portion between the end face and a top portion of the U-shaped hole, the removable tip further adapted to engage and provide axial thrust on a press pin lodged into a latch; and (d) means for connecting the first member to the second member in secure rotatable relationship to allow the second member flat inner face to be in facing relationship with the first member head portion's flat inner face.

* * * * *